No. 739,776. PATENTED SEPT. 22, 1903.
H. W. BUCK.
CONTROLLING ELECTRIC MOTORS.
APPLICATION FILED AUG. 9, 1901.
NO MODEL.
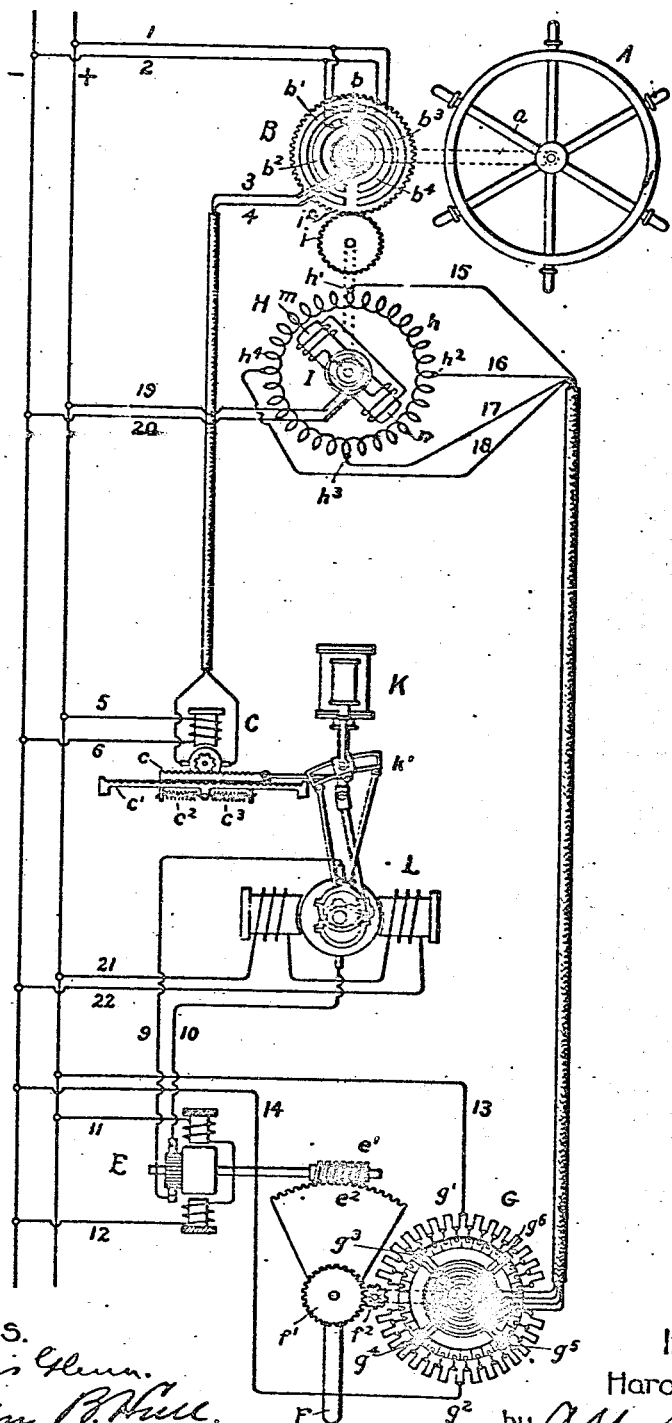
Witnesses.
John Ellis Glenn.
Benjamin R. Hull.
Inventor.
Harold W. Buck.
by Albert G. Davis
Atty.

No. 739,776. Patented September 22, 1903.

UNITED STATES PATENT OFFICE.

HAROLD W. BUCK, OF NIAGARA FALLS, NEW YORK, ASSIGNOR TO GENERAL ELECTRIC COMPANY, A CORPORATION OF NEW YORK.

CONTROLLING ELECTRIC MOTORS.

SPECIFICATION forming part of Letters Patent No. 739,776, dated September 22, 1903.

Original application filed November 17, 1900, Serial No. 36,810. Divided and this application filed August 9, 1901. Serial No. 71,476. (No model.)

*To all whom it may concern:*

Be it known that I, HAROLD W. BUCK, a citizen of the United States, residing at Niagara Falls, county of Niagara, State of New York, have invented certain new and useful Improvements in Controlling Electric Motors, of which the following is a specification.

This application is a division of my application, Serial No. 36,810, filed November 17, 1900.

My present invention relates to means for producing a predetermined movement at a distant point and comprises an improved system especially adapted for use in ship-steering as a means for controlling from the pilot-house the movement of the rudder, although it is not limited to such application.

My invention will be understood by reference to the following description, taken in connection with the accompanying drawing, while its scope will be pointed out in the appended claims.

In the drawing, which is a diagrammatic representation of my controlling system as applied to ship-steering, A indicates a steering-wheel, which may be located at any desired point on the ship and which is connected by any suitable gearing (indicated in the drawing by the dotted-line connection $a$) to one of the members of a controlling device or switch B. As shown, the steering-wheel is connected to the member $b$ of the switch B, this member being provided with two contacts, which are connected through collecting rings and brushes to the conductors 3 and 4. The other member of the switch B is provided with two sets of circularly-arranged contacts $b'$ $b^2$ and $b^3$ $b^4$, which are reversely connected with the mains + and — (which may be the lighting-mains of the ship) by means of the conductors 1 and 2.

The conductors 3 and 4 are led through a cable to the armature of a pilot-motor C, of which the field-winding is connected, by means of conductors 5 and 6, to a suitable source of direct-current supply—as, for example, the mains + and —. In some of the claims this motor is referred to as a "second" motor.

The motor C is operatively connected, by means of any suitable gearing—a pinion and segmental rack, as shown in the drawing—to the valve-gear of a reversible engine K, which is arranged to drive a generator L, connected to supply current to the main motor E. The motor C therefore controls the operation of the main motor.

In the construction shown the armature-shaft of the motor C is geared to a rack $c$, which is slidingly mounted on a support $c'$ and is normally maintained in the position shown in the drawing by the springs $c^2$ and $c^3$. The rack $c$ is connected to a Stevenson link-motion, and as it is moved to one or the other of its extreme positions by the motor C the valves of the engine K are moved so as to cause the engine to rotate the armatures of the dynamo L in one direction or the other, and therefore to supply current in one direction or the other to the motor E.

The motor E is located adjacent to the rudder and is connected to the rudder F through any suitable gearing, as shown, through the worm $e'$ and pinion $e^2$.

Adjacent to the rudder is located a transmitting device G, comprising a plurality of rheostats $g'$ and $g^2$, the contacts of which are arranged in a circle. Each of the two rheostats is connected at its middle point to one of the mains + and — through the conductors 13 and 14. A plurality of brushes $g^3$ to $g^6$, inclusive, are suitably supported for rotation over the contacts of the rheostats, and each of these brushes is connected, through a collecting ring and brush, to one of the conductors 15 to 18, inclusive, which lead through a cable to the winding of an electromotive device H, located adjacent to the switch B. The connection between the rudder F and the transmitting device G may be made by means of any suitable gearing and is indicated in the drawing by the gears $f'$ and $f^2$, the former of which is connected to the rudder-post and the latter to the rotating member of the transmitting device.

The motive device H comprises two members, one of which is polarized in a definite direction by means of current supplied from the mains + and − through the conductors 19 and 20 and the other of which is provided with a winding so connected to the conductors 15 to 18, inclusive, that the said member will be polarized in successively-advancing positions as the rotatable member of the transmitting device G is advanced by the movement of the rudder.

As shown, the transmitting device G is provided with but four brushes, the diametrically opposite brushes being connected to diametrically opposite points in the winding $h$ of the motive device H. It is of course evident that any desired number of brushes and connecting-conductors may be used.

In the particular position of the transmitting device indicated in the drawing current flowing from the + main through the conductor 13 to the middle point of the rheostat $g'$ will divide equally, a part flowing through the brush $g^3$ and the conductor 15 to the point $h'$ in the winding $h$, another part flowing through the brush $g^6$ and the conductor 18 to the point $h^4$ in the winding $h$, the return-circuit leading through the portion of the winding $h$ between the points $h'$ and $h^2$ and $h^4$ and $h^3$ and back by way of conductors 16 and 17 and brushes $g^4$ and $g^5$ to the rheostat $g^2$ and thence to the conductor 14, connected to the main. The fixed member of the motive device H will therefore be polarized by current flowing from the mains + and − through the transmitting device G and the winding $h$ of the motive device along the line $m\,n$, and the rotatable member I of the said motive device will be positively held in the position shown in the drawing.

As the brushes of the transmitting device are rotated the line of polarization will be gradually shifted, and when the brushes $g^3$ and $g^5$ of the transmitting device lie directly under the middle points of the rheostats $g'$ and $g^2$ current will be supplied through the conductors 15 and 17 only, and the fixed member of the motive device H will be polarized along the line joining the points $h'$ and $h^3$. Further rotation of the transmitting device will cause the line of polarization of the fixed member of the motive device H to gradually shift until when the brushes $g'$ and $g^6$ lie opposite the middle points of the rheostats $g'$ and $g^2$, respectively, current will be supplied to the winding of the said motive device through the conductors 16 and 18 only, and the fixed member of the said motive device will be polarized along the line joining the points $h^2$ and $h^4$, and so on as the rotatable member of the transmitting device is rotated.

The rotatable member of the motive device H is connected by means of any suitable gearing—as shown, through the gears $i$ and $i^2$—to that member of the switch B on which the contacts $b'$ to $b^4$, inclusive, are mounted, so that as the brushes of the transmitting device are moved by the rudder this member of the switch B will be correspondingly or synchronously moved by the motive device H.

The operation of the system above described is as follows: Supposing the steering-wheel A to be rotated to the left, for example, by any predetermined amount, the member $b$ of the switch B will be correspondingly rotated and its contacts will be caused to move over the contacts $b'$ and $b^2$ by an amount dependent upon the movement given to the steering-wheel. Current will then be supplied from the mains + and − through the conductors 1 2, the contacts $b'\,b^2$, and the contacts on the member $b$ of the switch B to the conductors 3 4, which lead to the armature of motor C, and the said motor will be caused to rotate in one direction—say right-handedly—so as to move the rack $c$ and the reversing-gear $k'$ of the engine K into one of its extreme positions. This will cause the engine to start the dynamo L in rotation to supply current to the motor E. The motor E will start and will move the rudder through the gearing already described. The rudder in moving will cause the brushes of the transmitting device to rotate over the contacts of the two rheostats $g'$ and $g^2$, and the polarization of the fixed member of the motive device H will be gradually shifted, thereby causing the member I of said motive device to move by an amount corresponding to the movement of the rudder and to rotate the member of the switch B, on which the contacts $b'$ and $b^2$ are mounted, to the left until finally the circuit is broken between the contacts $b'$ and $b^2$ and the contacts carried by the member $b$. When this point is reached in the movement of the switch B, the circuit of the motor C will be opened, and the springs $c^2$ and $c^3$ will return the member $c$ to its off position, thereby moving the reversing-gear of the engine K into its mid-position and stopping the engine and the dynamo L. The motor E will then come to rest.

The ratio of the gearing between the rudder F and the transmitting device G to the gearing between the motive device H and the switch B is so chosen that when the rudder has been moved by an amount corresponding to the movement given to the steering-wheel A the members of the switch B will be brought to the relative position shown in the drawing.

The switch B and the motive device are preferably arranged beneath the deck adjacent to the pilot-house or bridge and the motor E and the transmitting device G adjacent to the rudder. The engine K and its dynamo L may evidently also be located at any desired point in the ship; but they are preferably located in the dynamo or engine room.

I have not attempted to illustrate any details of construction of the apparatus which goes to make up the system which constitutes my present invention, for the reason that such details are well understood in the art to which my invention relates. Moreover, I desire it to be understood that many changes in the specific apparatus employed may be made and other different means which are capable of accomplishing substantially the same results may be substituted for the elements or groups of elements illustrated without departing from the spirit and scope of my invention.

Having thus described my invention, what I claim as new, and desire to secure by Letters Patent of the United States, is—

1. The combination of a body to be moved, an electric motor operatively connected thereto, an engine-driven generator connected in circuit with said motor, an electromotive device controlling the valve-gear of said engine, a switch controlling the supply of current from a suitable source to the said electromotive device, a handle for operating said switch, and means, controlled by the body to be moved, for opening said switch when the said body has been moved by an amount corresponding to the movement of the switch-operating handle.

2. In combination, a body to be moved, a main electric motor operatively connected thereto, an engine-driven generator electrically connected to said main motor, a pilot-motor for actuating the valve-gear of said engine, a switch for said pilot-motor, a synchronous electromotive device operatively connected to said switch, and means for operating said device in accordance with the movement of the body to be operated.

3. In combination, an electric motor, an engine-driven generator electrically connected to said motor, a valve-gear by the operation of which the said engine may be started and stopped, and a pilot-motor for operating said valve-gear.

4. In combination, a body to be moved, an electric motor operatively connected thereto, an engine-driven generator electrically connected to said motor, a valve-gear by the operation of which the said engine may be started and stopped, a pilot-motor for operating the valve-gear, and a switch located at any desired point for controlling the operation of said pilot-motor.

5. In combination, a body to be moved, an electric motor operatively connected thereto, an engine-driven generator electrically connected to said motor, a valve-gear by the operation of which the said engine may be started and stopped, a pilot-motor for operating the valve-gear, a switch located at any desired point for controlling the operation of said pilot-motor, and means for opening said switch when the body to be moved has been moved by the desired amount.

6. In combination, a body to be moved, an electric motor operatively connected to said body, an engine-driven generator electrically connected to said motor, a pilot-motor for operating the valve-gear of said engine, a switch for closing the circuit of said pilot-motor, and a synchronous electromotive device for opening said switch, said device being operatively connected to one of the members of said switch, and electrically connected to a suitable source through a controlling-switch operated by the body to be moved.

7. In combination, an electric motor, an engine-driven generator electrically connected to said motor, a reversing valve-gear by the operation of which the said engine may be started, stopped and reversed, a pilot-motor for operating the valve-gear, and means for controlling the operation of said pilot-motor.

8. In combination, an electric motor, an engine-driven generator electrically connected to said motor, a reversing valve-gear for the engine, a pilot-motor for operating the valve-gear, and means tending to maintain the valve-gear normally at a zero position such that the engine will not run.

9. In combination, a main electric motor, an engine-driven generator electrically connected to said motor, a reversing valve-gear for the engine, an electrically-operated pilot-motor for actuating the valve-gear, a switch for controlling the operation of said pilot-motor, and means controlled by the main motor for opening said switch.

10. In combination with apparatus to be adjusted, an electric motor for adjusting it, an electric generator connected to actuate the motor, means for starting the generator by power in either direction at will, and means connected to be actuated with the motor for stopping the generator.

11. In combination with apparatus to be adjusted, an electric motor for adjusting it, an electric generator connected to actuate the motor, means for starting the generator at will, and an electric motor synchronously connected with the said motor for stopping the adjusting operation.

12. In combination with apparatus to be adjusted, and with a prime valved motor therefor, means for adjusting the valve of the motor to start it, electrical means for converting and transmitting energy therefrom, a second motor connected to be actuated by the said transmitted energy for adjusting the said apparatus to be adjusted, and automatic means for readjusting the said valve to stop the said valved motor.

13. In combination with apparatus to be adjusted, and with a prime valved motor therefor, means for adjusting the valve of the motor to start it, means for converting and transmitting energy therefrom, a second motor connected to be actuated by the said transmitted energy for adjusting the said apparatus to be adjusted, and a third motor connected to be actuated simultaneously with the said second motor, and connected to adjust the said valve to stop the said valved motor.

14. In combination with apparatus to be adjusted from a distance, a prime motor therefor, electrical means for transmitting motion from the motor to the said apparatus to be adjusted, a manually-actuated mechanism for starting and controlling the direction of operation of the said motor, and means actuated, at least indirectly, by the motor for stopping it.

In witness whereof I have hereunto set my hand this 7th day of August, 1901.

HAROLD W. BUCK.

Witnesses:
   H. B. BODINE,
   M. WILLSON.